(12) United States Patent
Liu et al.

(10) Patent No.: US 8,246,288 B2
(45) Date of Patent: Aug. 21, 2012

(54) MANIPULATOR

(75) Inventors: Da-Wei Liu, Shenzhen (CN); Hai-Yuan Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 341 days.

(21) Appl. No.: 12/500,732

(22) Filed: Jul. 10, 2009

(65) Prior Publication Data
US 2010/0158655 A1    Jun. 24, 2010

(30) Foreign Application Priority Data
Dec. 24, 2008    (CN) .......................... 2008 1 0306500

(51) Int. Cl.
*B25J 17/02*    (2006.01)
(52) U.S. Cl. .......... 414/729; 74/490.06; 403/13; 901/29
(58) Field of Classification Search .................. 414/380, 414/729; 74/490.05, 490.06; 403/11, 13; 192/56.6, 56.1; 901/28, 29, 49
See application file for complete search history.

(56) References Cited

U.S. PATENT DOCUMENTS

| | | | |
|---|---|---|---|
| 4,669,192 A | 6/1987 | Matheson et al. | |
| 4,918,991 A | 4/1990 | Bucher et al. | |
| 5,915,506 A * | 6/1999 | Farina | 188/151 R |
| 5,964,124 A * | 10/1999 | Nunes et al. | 74/490.01 |
| 6,214,057 B1 * | 4/2001 | Spencer et al. | 403/13 |

FOREIGN PATENT DOCUMENTS

| | | |
|---|---|---|
| CN | 2527459 Y | 12/2002 |
| JP | 2-48194 A | 2/1990 |
| JP | 6-143054 A | 5/1994 |
| TW | M257266 | 2/2005 |

* cited by examiner

*Primary Examiner* — Donald Underwood
(74) *Attorney, Agent, or Firm* — Altis Law Group, Inc.

(57) ABSTRACT

A manipulator includes a support arm, a grasping member, and a connecting assembly. The connecting assembly connects the support arm with the grasping member. A base is fixed to the support arm, and the holder is fixed to the base. The holder defines an assembling hole, and a perimeter of the assembling hole increases along a direction towards the base. The connecting member has a first assembling portion received in the assembling hole of the holder. The elastic member is positioned between the base and the connecting member, thus producing an elastic force to drive the connecting member to resist the holder.

14 Claims, 6 Drawing Sheets

MANIPULATOR

BACKGROUND

1. Technical Field

The present disclosure relates generally to manipulators and, more particularly, to a manipulator used in manufacturing.

2. Description of Related Art

Manipulators are widely used in the manufacturing industry to increase production efficiency. The manipulator generally moves in a predetermined path according to machining programs stored in a controller, to assemble or combine workpieces. However, the manipulator may experience positioning errors caused by inner components with insufficient precision, such as gears. Therefore, the manipulator may deviate from the predetermined path, resulting in unsatisfactory assembly standards.

Therefore, a manipulator which overcomes the described limitations is desirable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
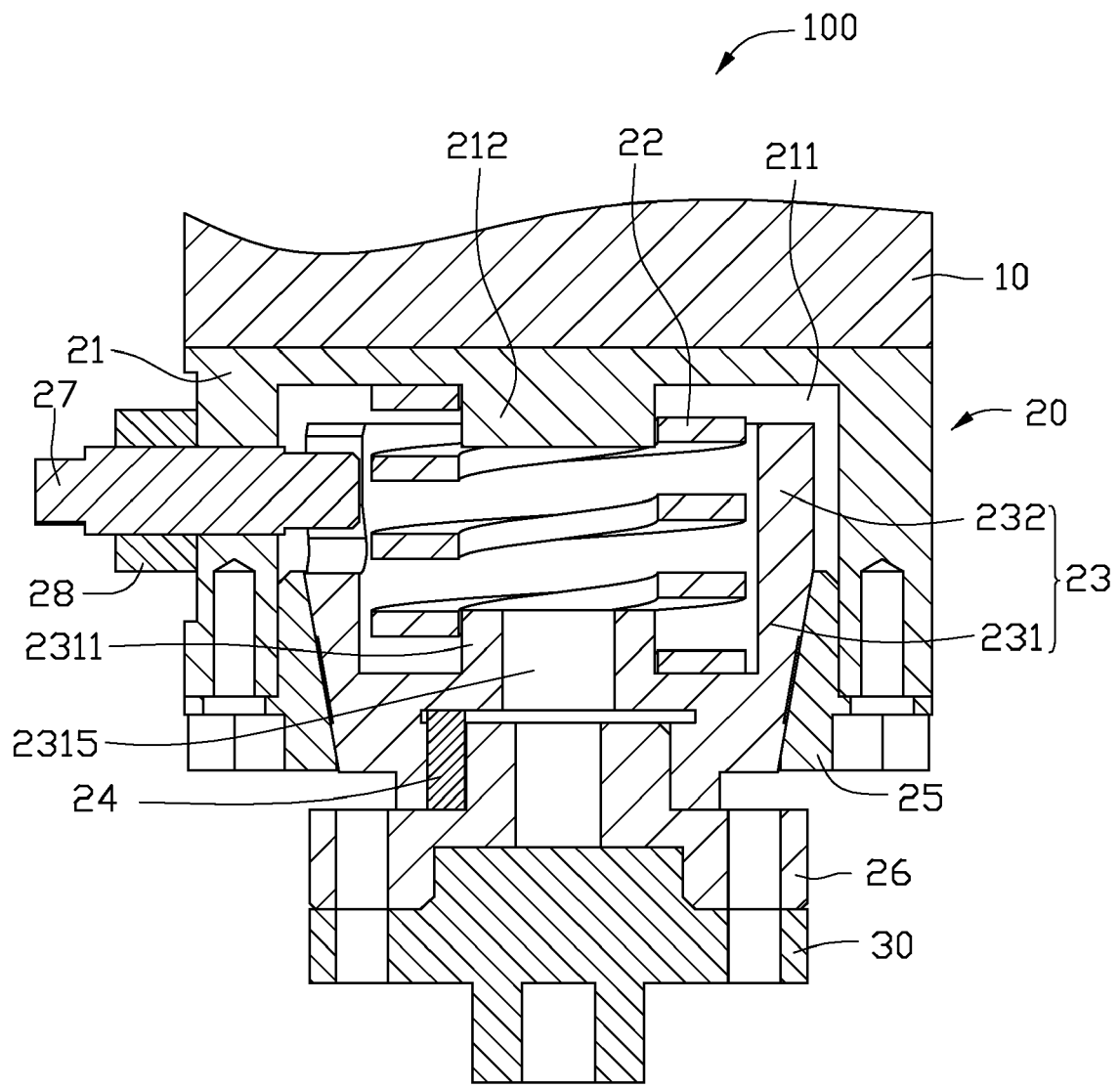
FIG. 1 is a cross-section of an embodiment of a manipulator, the manipulator including a support arm, a grasping member, and a connecting assembly.

Referring to FIG. 1, an embodiment of a manipulator 100 includes a support arm 10, a grasping member 30, and a connecting assembly 20 connecting the support arm 10 with the grasping member 30.

Figure 2:
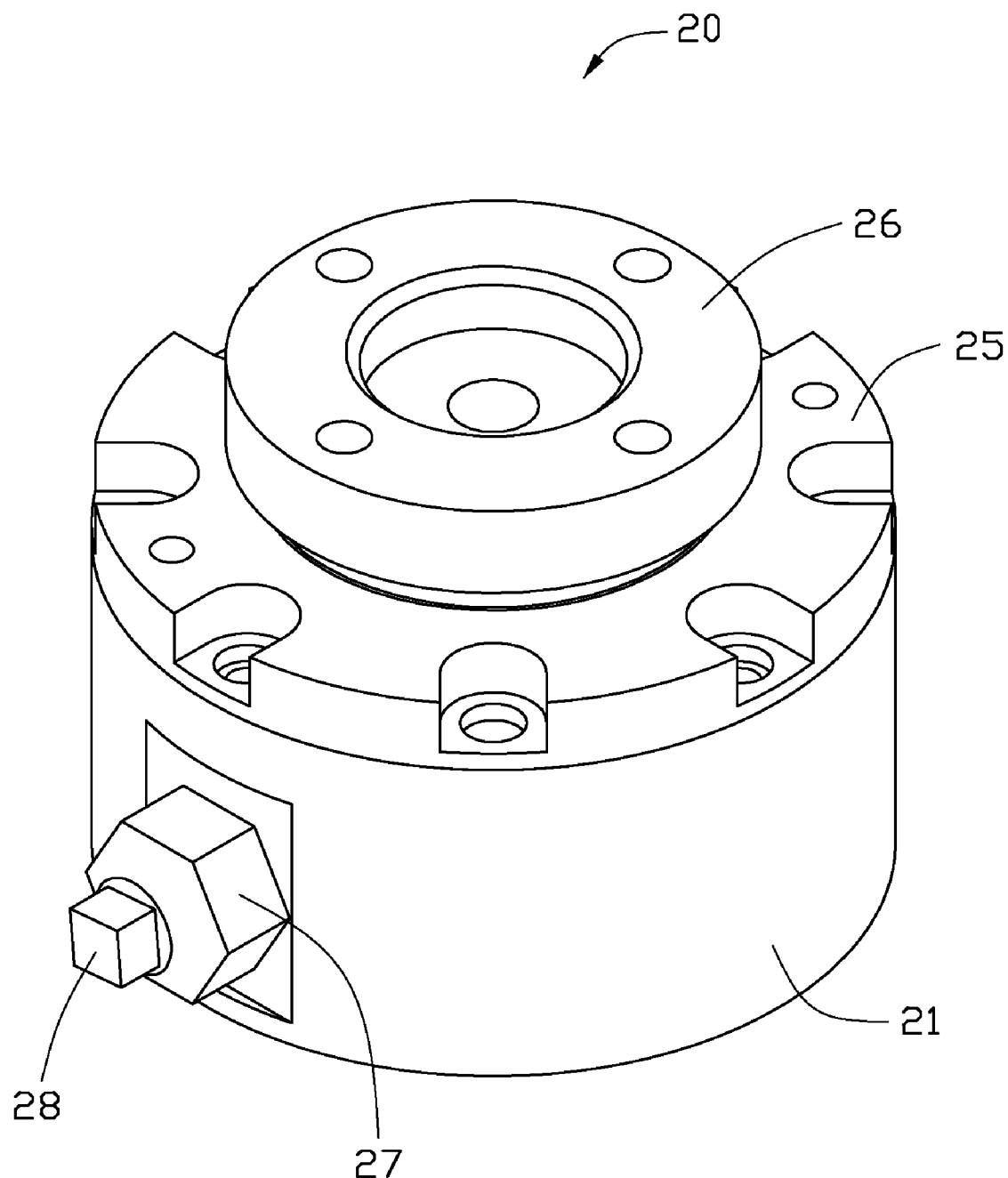
FIG. 2 is an assembled, isometric view of the connecting assembly of FIG. 1.
Figure 3:
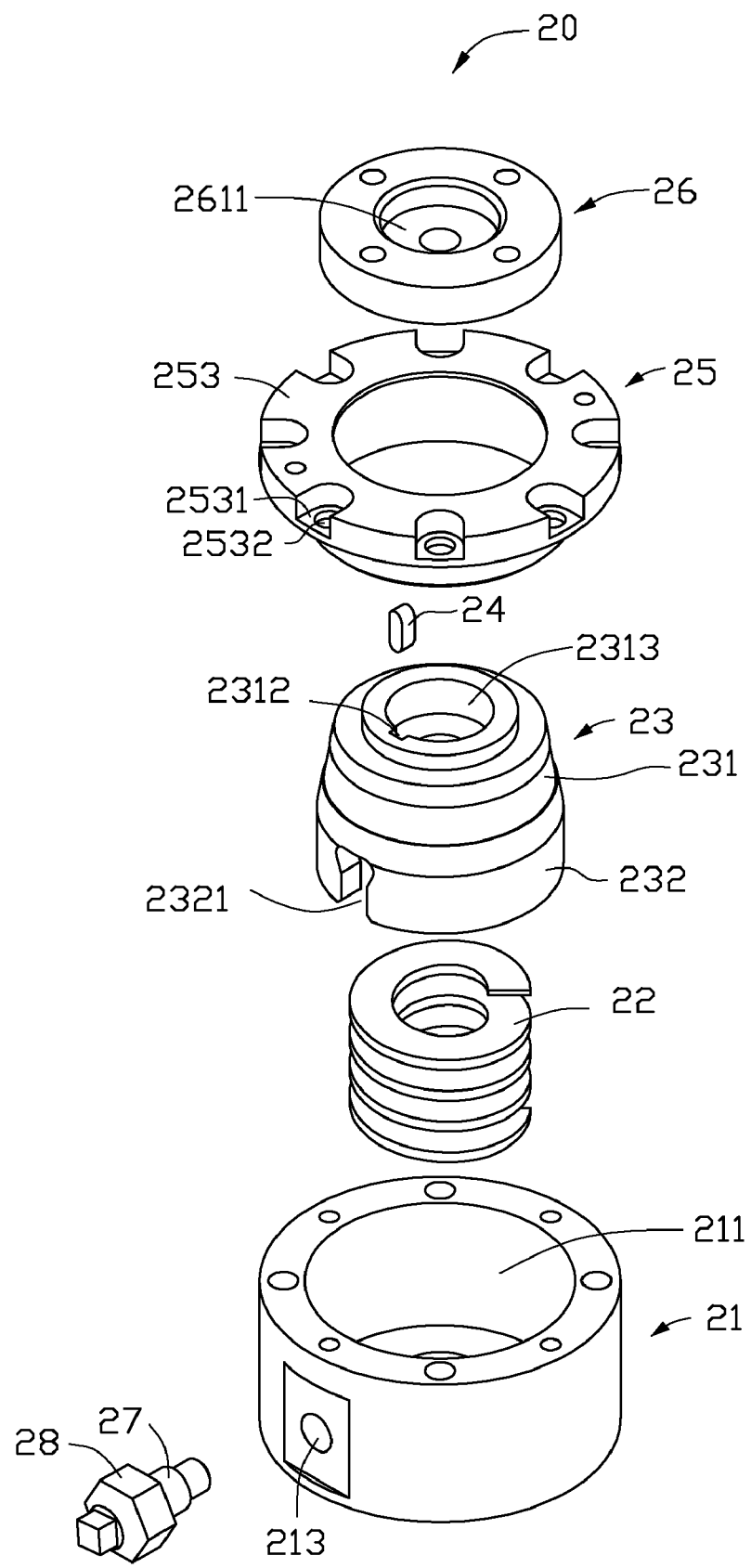
FIG. 3 is an exploded, isometric view of the connecting assembly of FIG. 1.
Figure 4:
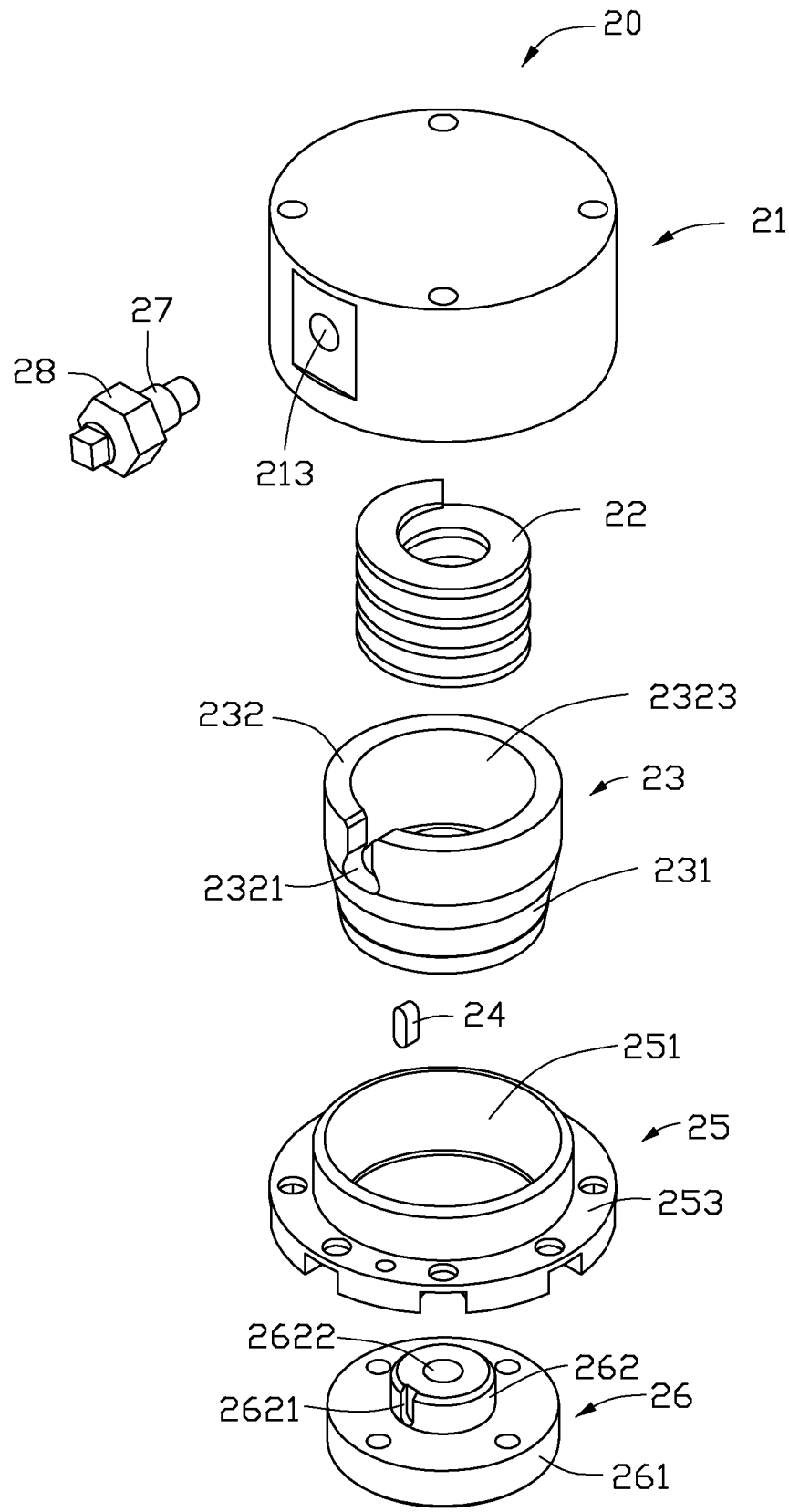
FIG. 4 is similar to FIG. 3, but viewed from another aspect.

Referring also to FIGS. 2 through 4, the connecting assembly 20 includes a base 21, an elastic member 22, a connecting member 23, an engaging member 24, a holder 25, a flange 26, an adjusting member 27, a fastening member 28, and a plurality of fasteners (not shown).

The base 21 is substantially cylindrical. A cylindrical protrusion 212 (shown in FIG. 1) is formed on a bottom surface thereby defining a receiving groove 211. The base 21 further defines a through hole 213 in the cylindrical surface communicating with the receiving groove 211. The elastic member 22 is a compression spring in this embodiment.

The connecting member 23 includes a first assembling portion 231 and a second assembling portion 232. The first assembling portion 231 decreases in size with distance from the second assembling portion 232. In the illustrated embodiment, the first assembling portion 231 is a frusto-conical shaped, and the second assembling portion 232 is cylindrical. The first assembling portion 231 defines a receiving bore 2313 in a center portion. A positioning protrusion 2311 extending towards the second assembling portion 232 is formed on a bottom wall, thereby defining an assembling bore 2323 in a center portion. The positioning protrusion 2311 defines a through hole 2315 communicating with the receiving bore 2313. An engaging groove 2312, partially receiving the engaging member 24, is defined in the sidewall defining the receiving bore 2313. The second assembling portion 232 defines a positioning cutout 2321 in the cylindrical surface.

The holder 25 defines an assembling hole 251 in a center portion. A fixing portion 253 is formed on an end of the holder 25. A perimeter of the assembling hole 251 increases with distance from the fixing portion 253. The fixing portion 253 defines a plurality of fixing holes 2532 arranged regularly, and a plurality of cutouts 2531 corresponding to the fixing holes 2532.

The flange 26 includes a main portion 261 and a connecting portion 262 formed on an end of the main portion 261. In the illustrated embodiment, both the main portion 261 and the connecting portion 262 are cylindrical. The main portion 261 defines an assembling bore 2611 in a center portion. The connecting portion 262 defines a restricting groove 2621 in the cylindrical surface to partially receive the engaging member 24. The connecting portion 262 further defines a threaded hole 2622 communicating with the assembling bore 2611.

In assembling the connecting assembly 20, the holder 25 sleeves on the first assembling portion 231 of the connecting member 23. The engaging member 24 partially engages with the engaging groove 2312 of the connecting member 23. The connecting portion 262 is received in the receiving bore 2313 of the connecting member 23, and the engaging member 24 is partially received in the restricting groove 2621 of the flange 26, thus preventing the connecting member 23 from rotating relative to the flange 26. A fastener extends through the through hole 2315 of the connecting member 23, and engages with the threaded hole 2622 of the flange 26, thus fixedly connecting the connecting member 23 with the flange 26. One end of the elastic member 22 partially sleeves on the positioning protrusion 2311. The connecting member 23 is received in the receiving groove 211 of the base 21, and an opposite end of the elastic member 22 partially sleeves on the protrusion 212. The fixing portion 253 of the holder 25 is fixed to the base 21 via fasteners. The adjusting member 27 extends through the through hole 213 of the base, and the positioning cutout 2321 of the connecting member 23, to prevent the connecting member 23 from rotating relative to the base 21. The fastening member 28 engages with the adjusting member 27. After the connecting assembly 20 is assembled, the connecting member 23 can move axially relative to the holder 25.

Figure 5:
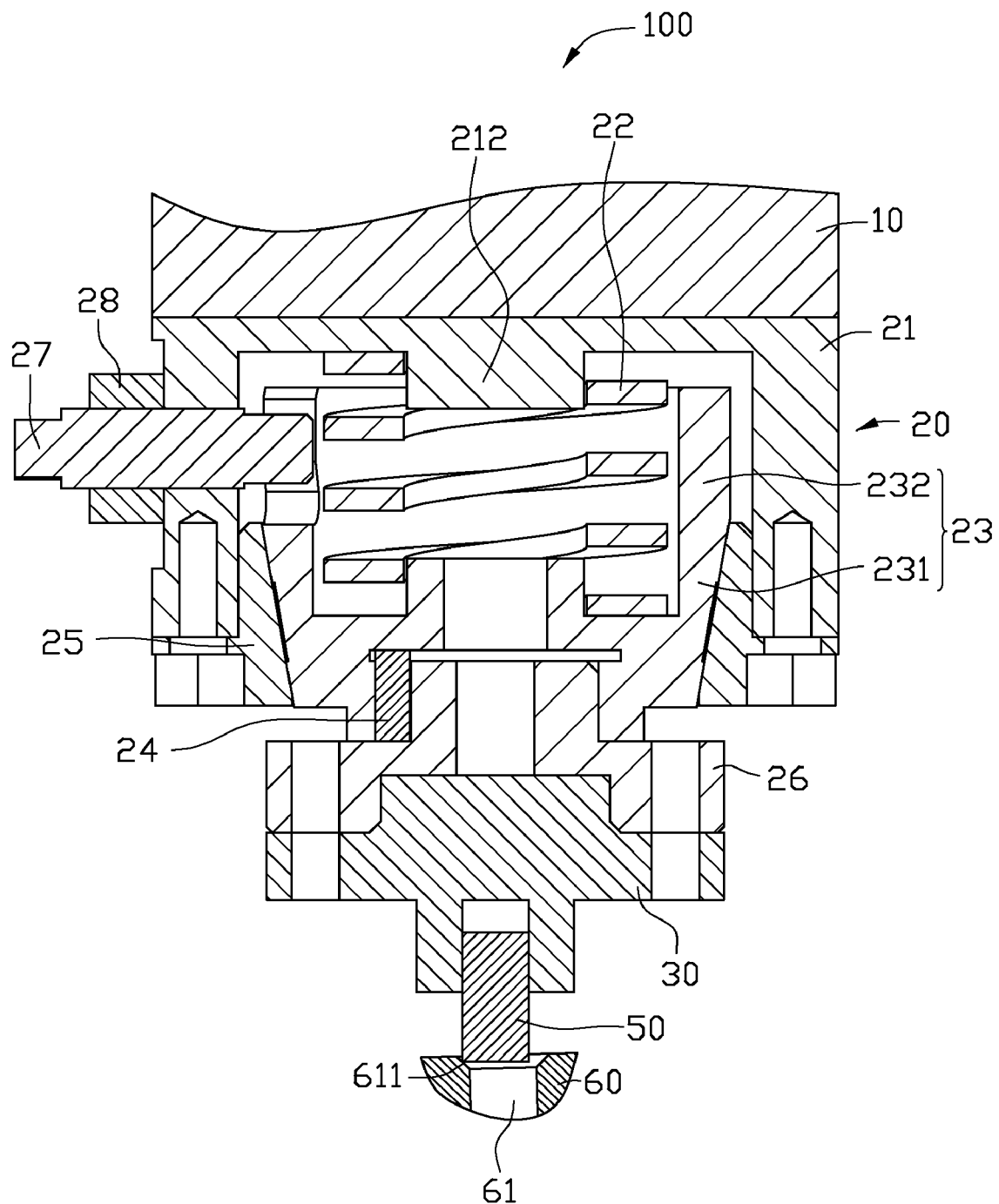
FIG. 5 is a cross-section of the manipulator of FIG. 1, illustrating a process of attaching a first workpiece to a second workpiece.

Referring to FIG. 5, in use, the connecting assembly 20 is assembled to the support arm 10. The grasping member 30 partially engages with the assembling bore 2611 of the main portion 261. A first workpiece 50 is grasped by the grasping member 30. A second workpiece 60 is mounted on a worktable or grasped by another manipulator. The manipulator 100 moves to place the first workpiece 50 in a connecting hole 61 of the second workpiece 60. Since a real moving path of the manipulator 100 deviates slightly from a predetermined path, the axis of the first workpiece 50 cannot be aligned perfectly with the axis of the connecting hole 61. That is, the first workpiece 50 cannot be placed in the connecting hole 61 as previously designed, and resists a guiding portion 611 of the connecting hole 61.

Figure 6:
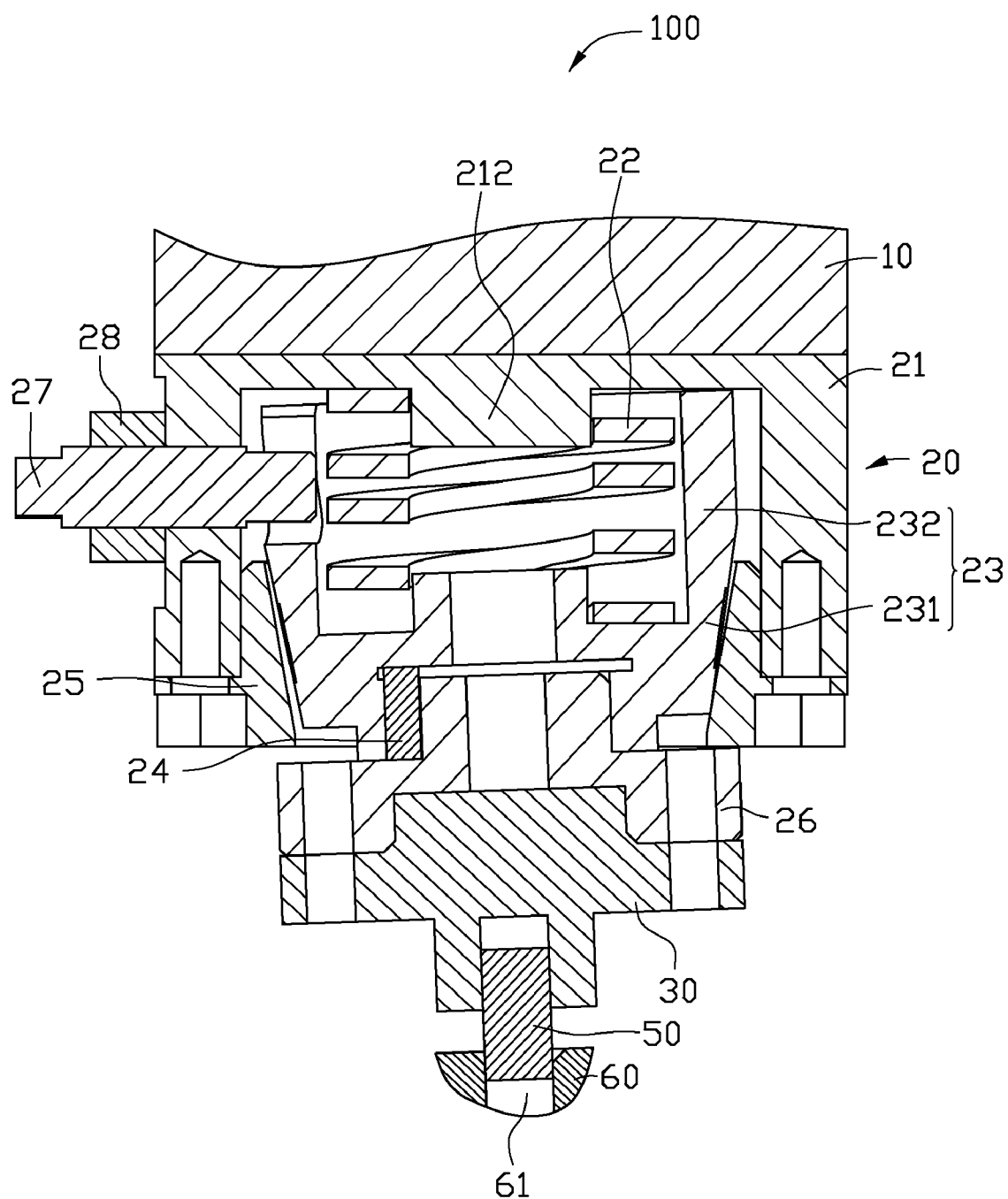
FIG. 6 is similar to FIG. 5, but shows the first workpiece attached to the second workpiece.

Referring to FIG. 6, the manipulator 100 moves closer towards the second workpiece 60. If the first workpiece 50 is not perfectly aligned with the second workpiece 60, the connecting member 23 can slide along the holder 25 thereby compressing the elastic member 22, due to the first workpiece 50 resisting the guiding portion 611. Thus, a space is formed between the connecting member 23 and the holder 25, and the connecting member 23 deviates at an angle relative to the holder 25, so that the axis of the first workpiece 50 can align with the axis of the connecting hole 61. Therefore, the first workpiece 50 can be aligned to the second workpiece 60 with low friction, depending on the stored elastic force in the elastic member 22, thereby preventing the first workpiece 50 from damage.

After the first workpiece 50 is placed in the connecting hole 61 of the second workpiece 60, the connecting member 23 returns to the original position, driven by the restoring elastic force of the elastic member 22. Since the elastic member 22 is a compression spring, the connecting member 23 again tightly engages the holder 25.

It should be pointed out that the first assembling portion 231 may be other shapes, such as hemispherical. The engaging member 24 can be integrally formed with the first assembling portion 231. The connecting assembly 20 may not include the adjusting member 27 and the fastening member 28, rather, a positioning pole can be formed on the inner surface of the base 21, engaging the assembling bore 2323 of the connecting member 23. In addition, the flange 26 can be integrally formed with the first assembling portion 231, and the connecting member 23 can be integrally formed with the base 21.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A manipulator, comprising:
    a support arm;
    a grasping member; and
    a connecting assembly connecting the support arm with the grasping member, the connecting assembly comprising:
        a base fixed to the support arm;
        a holder fixed to the base, the holder defining an assembling hole, wherein a perimeter of the assembling hole increases towards the base;
        a connecting member having a first assembling portion received in the assembling hole of the holder; and
        an elastic member positioned between the base and the connecting member, thus producing an elastic force to drive the connecting member to resist the holder;
    wherein the first assembling portion defines a receiving bore and an engaging groove communicating with the receiving bore; the connecting assembly further comprises a flange and an engaging member, the flange engaged with the connecting member and comprises a connecting portion engaging with the receiving bore of the first assembling portion, the connecting portion defines a restricting groove, the engaging member engaged in the engaging groove of the first assembling portion and the restricting groove of the connecting portion.

2. The manipulator of claim 1, wherein the first assembling portion is frusto-conical shaped, and is received in the assembling hole of the holder.

3. The manipulator of claim 1, wherein the connecting member further comprises a second assembling portion formed at an end of the first assembling portion.

4. The manipulator of claim 3, wherein the second assembling portion defines an assembling bore in which the elastic member is partially received.

5. The manipulator of claim 4, wherein the base defines a bore for receiving the holder and the connecting member, and a protrusion is formed in the receiving bore of the base, on which the elastic member is sleeved.

6. The manipulator of claim 5, wherein the second assembling portion defines a positioning cutout communicating with the assembling bore; the base defines a through hole communicating with the receiving bore of the base; the connecting assembly further comprises an adjusting member extending through the through hole of the base and engaged in the positioning cutout.

7. The manipulator of claim 6, wherein the connecting assembly further comprises a fastening member engaged with the adjusting member.

8. The manipulator of claim 1, wherein the elastic member is a compression spring.

9. A manipulator, comprising:
    a support arm;
    a grasping member; and
    a connecting assembly connecting the support arm with the grasping member, the connecting assembly comprising:
        a base fixed to the support arm;
        a holder fixed to the base;
        a connecting member having a first assembling portion engaging with the holder; and
        an elastic member positioned between the base and the connecting member, wherein when an external force is applied on the connecting member, the connecting member moves to compress the elastic member, and is oblique relative to the holder; when the external force is removed, elastic force produced by the elastic member drives the connecting member to return to resisting the holder;
    wherein the first assembling portion defines a receiving bore and an engaging groove communicating with the receiving bore; the connecting assembly further comprises a flange and an engaging member, the flange engaged with the connecting member and comprises a connecting portion engaging with the receiving bore of the first assembling portion, the connecting portion defines a restricting groove, the engaging member engaged in the engaging groove of the first assembling portion and the restricting groove of the connecting portion.

10. The manipulator of claim 9, wherein the first assembling portion is frusto-conical shaped; the holder defines an assembling hole in which the first assembling portion is received.

11. The manipulator of claim 9, wherein the connecting member further comprises a second assembling portion formed at an end of the first assembling portion.

12. The manipulator of claim 11, wherein the second assembling portion defines an assembling bore in which the elastic member is partially received.

13. The manipulator of claim 12, wherein the base defines a receiving bore for receiving the holder and the connecting member, and a protrusion is formed in the receiving bore of the base, on which the elastic member is sleeved.

14. The manipulator of claim 13, wherein the second assembling portion defines a positioning cutout communicating with the assembling bore; the base defines a through hole communicating with the receiving bore of the base; the connecting assembly further comprises an adjusting member extending through the through hole of the base and engaged in the positioning cutout.

* * * * *